(12) United States Patent
Klinghult

(10) Patent No.: US 7,636,517 B2
(45) Date of Patent: Dec. 22, 2009

(54) LENS ADJUSTING DEVICE COMPRISING PROTECTION ARRANGEMENT

(75) Inventor: Gunnar Klinghult, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 320 days.

(21) Appl. No.: 11/531,406

(22) Filed: Sep. 13, 2006

(65) Prior Publication Data

US 2008/0008462 A1    Jan. 10, 2008

Related U.S. Application Data

(60) Provisional application No. 60/818,975, filed on Jul. 7, 2006.

(51) Int. Cl.
*G03B 17/18* (2006.01)
(52) U.S. Cl. ............ 396/53; 396/50; 396/87; 348/208.2; 348/208.3; 359/697
(58) Field of Classification Search .......... 396/50, 396/52–54, 86–88, 120, 133, 134–135; 348/208.1–208.2
See application file for complete search history.

(56) References Cited

U.S. PATENT DOCUMENTS

| | | | | |
|---|---|---|---|---|
| 5,978,600 | A * | 11/1999 | Takeuchi et al. | 396/53 |
| 6,055,378 | A * | 4/2000 | Oono et al. | 396/82 |
| 6,359,837 | B1 * | 3/2002 | Tsukamoto | 368/10 |
| 6,826,361 | B1 * | 11/2004 | Yost | 396/97 |
| 6,970,277 | B1 * | 11/2005 | Makishima | 359/238 |
| 6,999,117 | B2 * | 2/2006 | Yamazaki | 348/222.1 |
| 2003/0122804 | A1 * | 7/2003 | Yamazaki et al. | 345/179 |
| 2005/0116045 | A1 * | 6/2005 | Chang | 235/472.03 |
| 2006/0107213 | A1 * | 5/2006 | Kumar et al. | 715/700 |
| 2007/0230747 | A1 * | 10/2007 | Dunko | 382/107 |

FOREIGN PATENT DOCUMENTS

GB    2416036    1/2006

OTHER PUBLICATIONS

International Search Report and Written Opinion dated May 7, 2007, issued in corresponding PCT Application No. PCT/EP2006/012390, 11 pages.

* cited by examiner

*Primary Examiner*—Melissa J Koval
*Assistant Examiner*—Bret Adams
(74) *Attorney, Agent, or Firm*—Harrity & Harrity, LLP

(57) ABSTRACT

A lens adjusting device includes a moveable lens supporting portion; a displacement arrangement that displaces the lens supporting portion, where the displacement arrangement generates a signal corresponding to movement, of the lens supporting portion, associated with an acceleration event; a device that compares the signal to a pre-defined threshold level of acceleration; and a protection arrangement to be activated to protect the lens supporting portion when a result of the comparison indicates that the pre-defined threshold is exceeded.

20 Claims, 5 Drawing Sheets

LENS ADJUSTING DEVICE COMPRISING PROTECTION ARRANGEMENT

RELATED APPLICATION

This application claims priority under 35 U.S.C. § 119 based on U.S. Provisional Application Ser. No. 60/818,975, filed Jul. 7, 2006, the disclosure of which is hereby incorporated herein by reference.

TECHNICAL FIELD

The present invention relates to a motion detection device. More particularly, the invention relates to a part of an imaging device that senses motion.

BACKGROUND OF THE INVENTION

Auto focus (AF) is a great time saver that is found in one form or another on most cameras today. In most cases, it helps to improve the quality of the taken pictures. AF often uses a computer to run a miniature motor that focuses the lens of a camera. Focusing is the moving of the lens in and out until the sharpest possible image of the subject is projected onto a receiver, such as a Charged Coupled Device (CCD) or CMOS detector. Depending on the distance of the subject from the camera, the lens has to be a certain distance from the receiver to form a clear image.

A camera equipped with AF uses some type of measuring for computing in order to detect the distance of the subject from the camera and based on the measured distance, the lens is moved to a suitable position.

FIG. 1 illustrates a schematic AF system 100 of a camera. The system 100 comprises a lens 110 in a lens housing 120, which is arranged in a telescopic manner to be displaced inside a second housing 130. The lens housing 120 is arranged to be displaced by means of a stepper motor 140. The stepper motor 140 is controlled by means of a microprocessor 150, which receives signals from a measuring arrangement 160, measuring the distance to a subject to be photographed. The AF may be active or passive, both of which well known to a person skilled in the art.

In U.S. Patent Publication No. 20060107213, motion is used as an input to a program running on a mobile device. The mobile device may also require input from an alphanumeric or text input device. The motion can be used for items such as selection from a list, or navigation on a map. The motion can be sensed on image processing of the output of the camera, or can be directly determined using an accelerometer. The camera uses images as motion detection data.

According to GB 2416036, a camera is provided with accelerometer sensors which are arranged to detect either movement indicative of the camera being dropped or knocked out of a user's hands, in which case the motor control unit is instructed to automatically retract the camera's lens unit in the few tenths of a second before the camera hits the ground, or to detect substantial upward movement indicative of intended use when the camera is in a standby state with the lens unit retracted.

Traditional accelerometers comprise an acceleration detecting element, for instance a partly freely moving element with a mass that upon acceleration will move relative to other parts of the accelerometer. Detectors located adjacent the partly freely moving element will detect this movement and some processing unit can translate this to a measure of the acceleration. This is an often used design in micromechanical solutions, for instance in MEMS (Micro Electro Mechanical Systems) technology, where the accelerometer is built into a small integrated circuit and provides an electrical signal proportional to the acceleration. Accelerometers are sensitive to different frequency ranges. The accelerometers can be provided to give signals for accelerations in one, two or three directions or more. However, these "solid state" accelerometers are quite expensive and take up some area on a circuit board, which for some applications reduces the benefit of having them or increases the cost more than what customers are willing to pay for the product.

SUMMARY OF THE INVENTION

The present invention offers a novel way of using the AF function of a camera, by allowing it to operate as a motion detector. In some implementations, the AF function may operate as an accelerometer. This is in contrast to the prior art which uses additional sensors for detecting the motion of the device.

In implementations described herein, an AF system is provided comprising a moveable portion connected to an arrangement for moving said movable portion, wherein said arrangement for moving said moveable portion is arranged to generate a signal corresponding to movement of said movable portion.

The movable portion may be a lens supporting portion. The moving arrangement may be a stepper motor. The moving arrangement may be at least one of a magnetic displacement element, a piezo electric displacement element, and a magneto elastic displacement element.

The device may further comprise a computational unit for converting the movement signal to acceleration units.

In another aspect of the present invention, a mobile communication device is provided. The mobile communication device may comprise a camera comprising a moveable portion for moving a lens of the camera and connected to an arrangement for moving said movable portion, wherein said arrangement for moving said moveable portion is arranged to generate a signal corresponding to movement of said movable portion.

The mobile communication device may further be arranged with a device for comparing the movement signal with a pre-defined threshold. The mobile communication device may further be arranged to communicate with a support center if the threshold has been passed and/or arranged to store the signal in a storage unit if the threshold has been passed.

The mobile communication device may further be arranged with a pedometer using the movement signal for counting steps.

In still another aspect of the present invention, a method of detecting an acceleration is provided comprises the steps of: using an actuator element in a camera for obtaining a signal indicative of a movement of the camera; reading the signal in a microprocessor; and converting the signal in the microprocessor to acceleration units.

In some implementations, the camera may be located in a mobile phone.

The method may further comprise a step of pre-conditioning the signal prior to reading the signal.

Implementations described herein provide a low cost and simple motion detection solution which can be implemented easily on existing circuit boards without adding any extra footprint on the circuit board. This is especially suitable for mobile phones with built in cameras with AF and/or a lens with zoom capability.

BRIEF DESCRIPTION OF THE DRAWINGS

The invention is further described in the following by reference to the exemplary embodiments in attached drawings, in which.

DETAILED DESCRIPTION OF PREFERRED EMBODIMENTS

Figure 1:
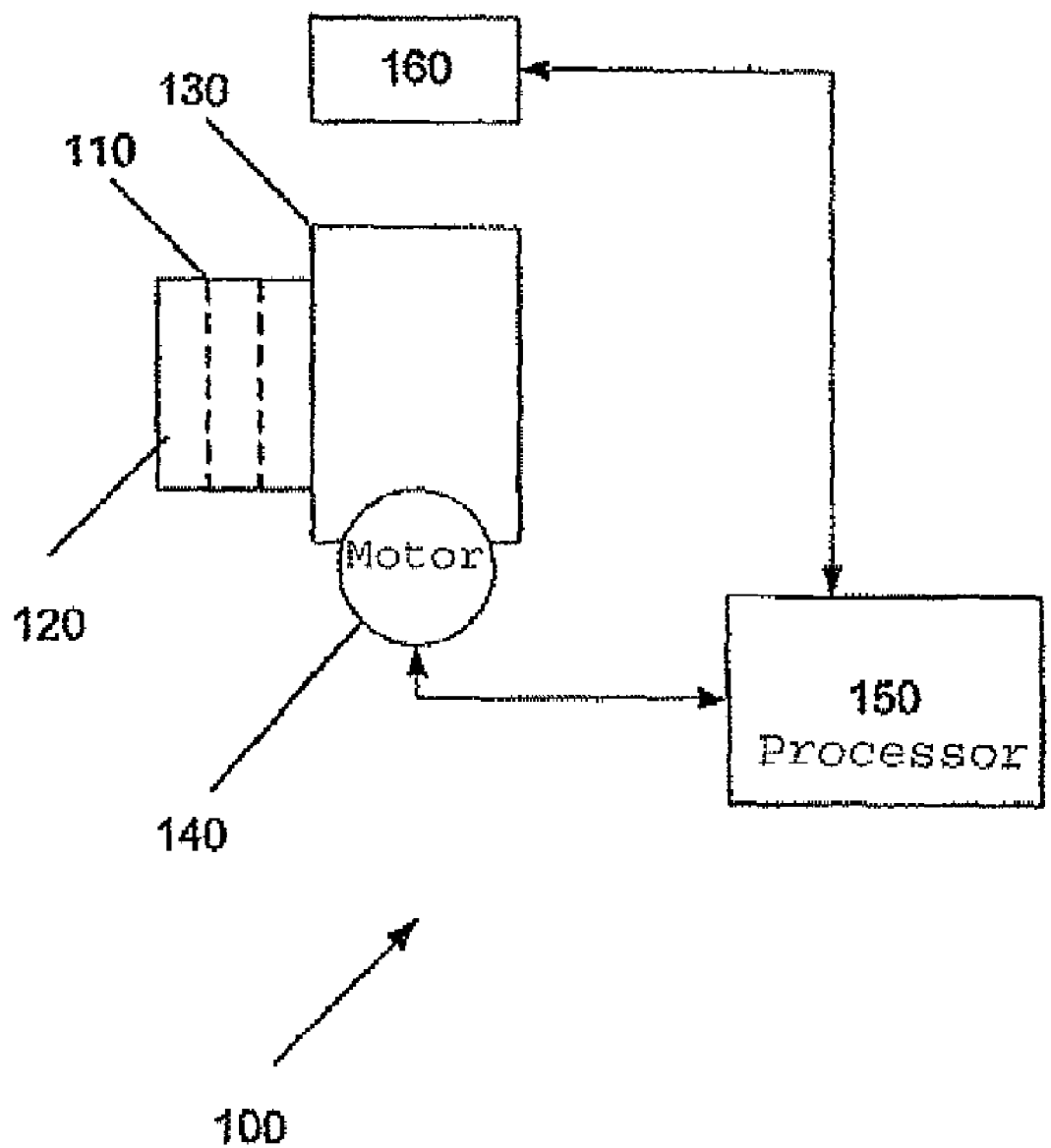
FIG. 1 illustrates the function of a known auto-focus system.
Figure 2:
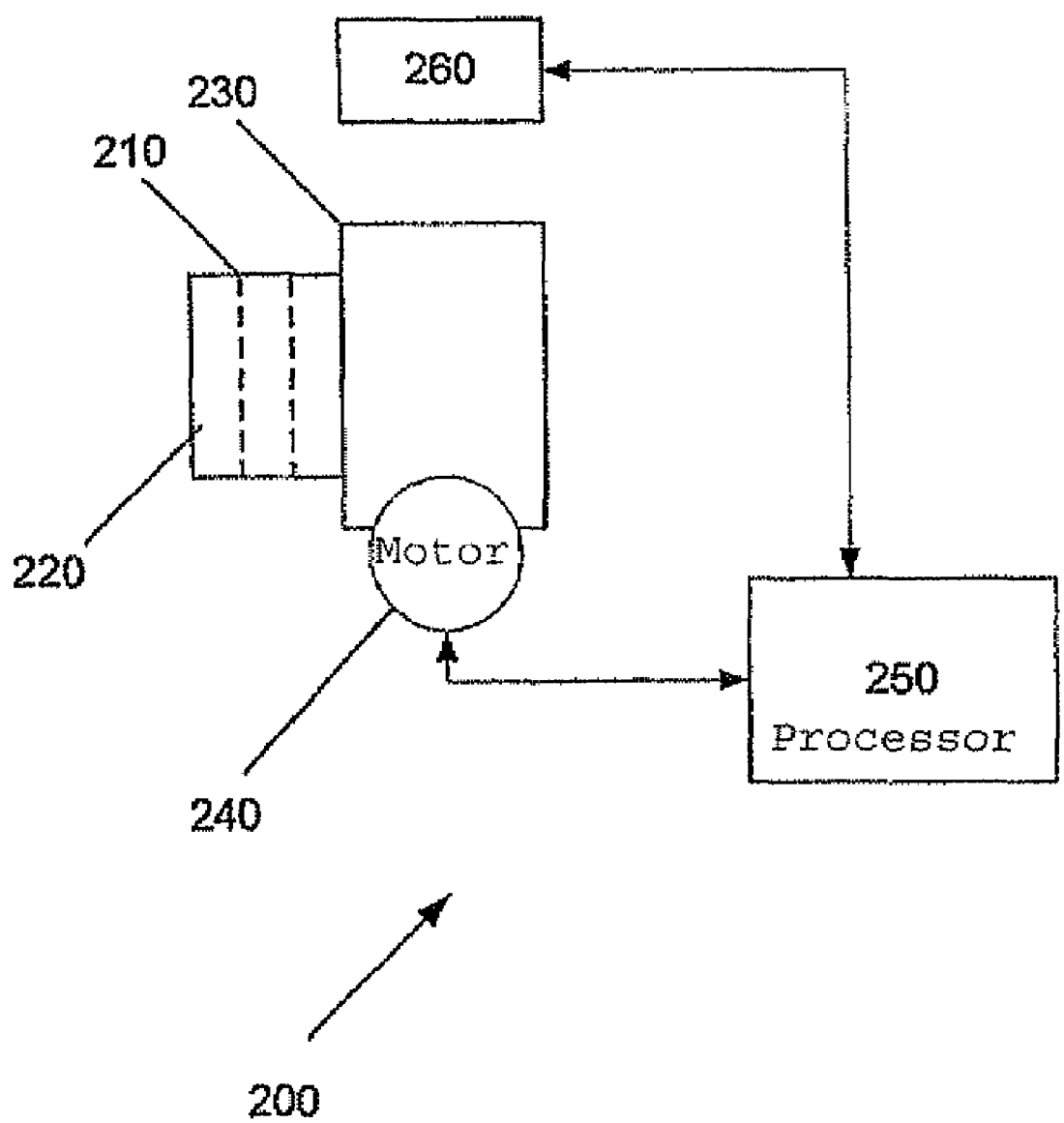
FIG. 2 illustrates schematically a first exemplary embodiment according to the present invention.

FIG. 2 illustrates a schematic auto focus (AF) system 200 according to the present invention. The system comprises a lens 210 in a lens housing 220, which may be arranged in a telescopic manner to be displaced inside a second housing 230. The lens housing 220 may be arranged to be displaced by means of a stepper motor 240. The stepper motor 240 motion is controlled by means of a microprocessor 250, which receives signals from a measuring arrangement 260, which measures the distance to a subject to be photographed. According to the present invention, the stepper motor 240 is arranged to allow some gap or clearance for the lens housing 220. Thus, the lens housing 220 including the lens 210 functions as a weight which upon motion of the system 200 will actuate the motor 240 by transferring forces from the lens system to the motor 240 directly or indirectly through a transmission system (not shown). The stepper motor 240, which comprises a magnet positioned in relation to a coil for rotating an armature, will upon movement of the rotor or motor 240 generate a signal in the coil, which corresponds to the movement of the lens housing 220. When a signal is applied to a coil or coil arrangement, a magnet in the vicinity of the coil will move. This motion/movement can be used as a motor by arranging the coil so as to provide a rotary movement of the magnet and the magnet in turn can then drive a linear or rotary motion device, for instance through a gear box (e.g., a worm gear) in turn displacing an object (e.g., the lens 210 of AF system 200). Moreover, moving a magnet in the vicinity of a coil will induce a signal in the coil, which can be detected and related to the movement of the magnet. The magnet moving in close proximity to the coil will thus induce a signal in the coil proportional to the movement and a transient acceleration movement will induce a transient signal in the coil. The mechanical transmission system may not suppress any forces applied to the lens system since the forces need to be transferred to the actuating element (e.g., the magnet in the above example).

It should be understood that other types of displacement devices may be used instead of the stepper motor 240 mentioned above. For instance, piezo-electrical or magneto-elastic motor based types of motors may be used. The actuating principle may be linear or rotary. In each case, forces and/or displacement of the lens system is transferred back to the motor through the transmission system.

The signal from the motor may then be input to a microprocessor, which will convert the signal to a movement (e.g., acceleration) signal. It should be noted that even though a lens 210 extracted in a telescopic manner is disclosed in above embodiment, the lens 210 may also be of a stationary type. The lens 210 may also be protected by a lens lid that may be moved manually by a motor for the protection of the lens 210 when not in use. The signal obtained in this magnet/coil example is a dynamic signal, i.e., an AC signal corresponding to the transient acceleration inducing the movement of the magnet. The signal thus obtained may be used as a one axis accelerometer signal.

The above mentioned AF system 200 is actuated by a magnet with a coil and the reverse effect is measured upon acceleration. However, there are other solutions for actuating the AF system 200 which also can used in reverse. That is, it is possible to obtain a signal proportional to a movement of the camera. For instance, piezo electrical based or magneto-elastic actuators can be used in a similar manner and they can also provide a small footprint (i.e., take up a small amount of space) for use in applications where this is of concern.

It should be appreciated that the signal from the motor may be digitized for easy reading in the microprocessor 250. For example, the signal from the motor 240 may be converted from an analog voltage signal to a digital signal using an analog to digital (A/D) converter internally in the microprocessor 250 or externally in a separate A/D converter integrated circuit device. The signal may also be amplified, filtered, rectified and/or converted to a voltage or current signal prior to or after digitizing, based on the particular circumstances, such as the particular digital device (e.g., microprocessor), which will analyze the signal. For example the signal can be amplified using an operational amplifier, such as a differential amplifier. These signal operations can be integrated in an AF driver microprocessor. The microprocessor 250 or some other computational device may be used to analyze the signals and take appropriate action depending on the signals. For example, the microprocessor and/or other computational device may control a reaction to the measured signals or store data relating to the signals in a memory for later use, e.g., for drop detection. The microprocessor 250 may be further arranged with a communication interface for communicating signals to external devices. A comparator may also be used in some implementations of the present invention to compare obtained signals to a pre-defined reference signal level and the comparator will output a signal if the obtained signal crosses the reference signal level (i.e., is above or below the reference signal). This may be accomplished by a hardware comparator, a software comparator implemented in program code in a microprocessor or some other computational device, e.g., an ASIC (Application Specific Integrated Circuit) or an FPGA (Field Programmable Gate Array).

A movement signal, such as an acceleration signal, may be obtained according to the implementation described above. In some implementations, the acceleration signal will provide information indicative of low to medium acceleration frequencies due to the mass of the motor/camera configuration.

The movement signal may, for example, be used to protect the device equipped with the system or as an output for other devices. For example, in one configuration, the protection may include rapid withdrawal of an extracted lens (e.g., lens 210) or shutting of a lens protection lid upon detection of an acceleration event. Further uses of the measured movement signal may be to detect harmful mechanical stresses that any system including features described herein have been subjected to, such as whether the object (e.g., camera) has been dropped. The signal may also be used for detecting movement of a person holding the system described herein, for instance as a pedometer.

Figure 3:
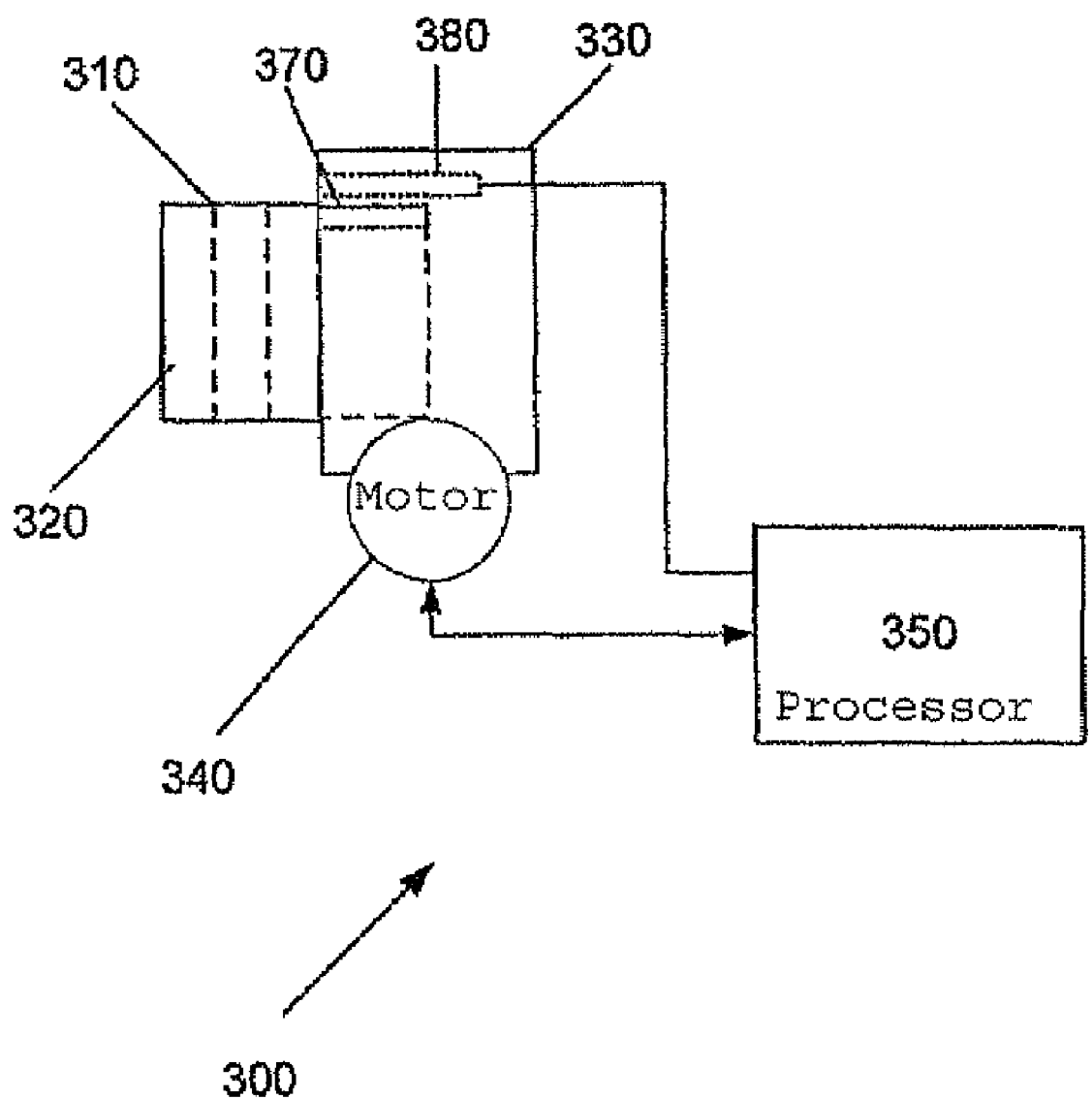
FIG. 3 illustrates schematically a second exemplary embodiment according to the present invention.

In another embodiment, as illustrated in FIG. 3, additional magnetic elements 370 and 380 may be used to sense the relative movement of the lens housing. One element 370 is arranged on the lens housing 320 and the second element 380 is arranged to sense the movement of the element. FIG. 3 illustrates a schematic auto-focus system 300 according to the present invention. The system comprises a lens 310 in a lens housing 320, which may be arranged in a telescopic manner to be displaced inside a second housing 330. The lens housing 320 is arranged to be displaced by means of a stepper motor 340. The induced current is connected directly or indirectly (A/D converted) to the microprocessor 350. For instance, in some configurations a permanent magnet is located in relation to a coil and during motor use, a current is induced in the coil which affects the position of the permanent magnet in relation to the coil. Conversely, if the permanent magnet is made to move in some way, a current is induced in the coil which can be translated into a signal indicative of the movement of the permanent magnet. For example, the movement of the magnet may be due to acceleration of the device where the magnet/coil system is located. Thus, it is possible to obtain signals indicative of such accelerations that can be used for different functions as discussed previously.

Aspects of the invention described herein can be used in any devices having an auto-focus function, such as cameras, digital and analogues, mobile phones provided with camera, etc. In addition, the term "camera" is intended to include, but is not limited to digital or film based still cameras, motion video cameras, and motion film cameras.

According to aspects described herein, advantageously a low cost accelerometer function may be implemented in devices where such functionality may be of interest and/or of practical use.

It should be noted that also motorized zoom lenses may operate with an actuator using technology that can be used in "reverse", i.e., give an output signal when a displacement operates on the motor and the invention is thus not limited to auto focus systems, but also include zoom lenses. Thus it is possible to use the motor used for zoom functionality of lenses as acceleration detection means in a manner similar to that described above.

Figure 4:
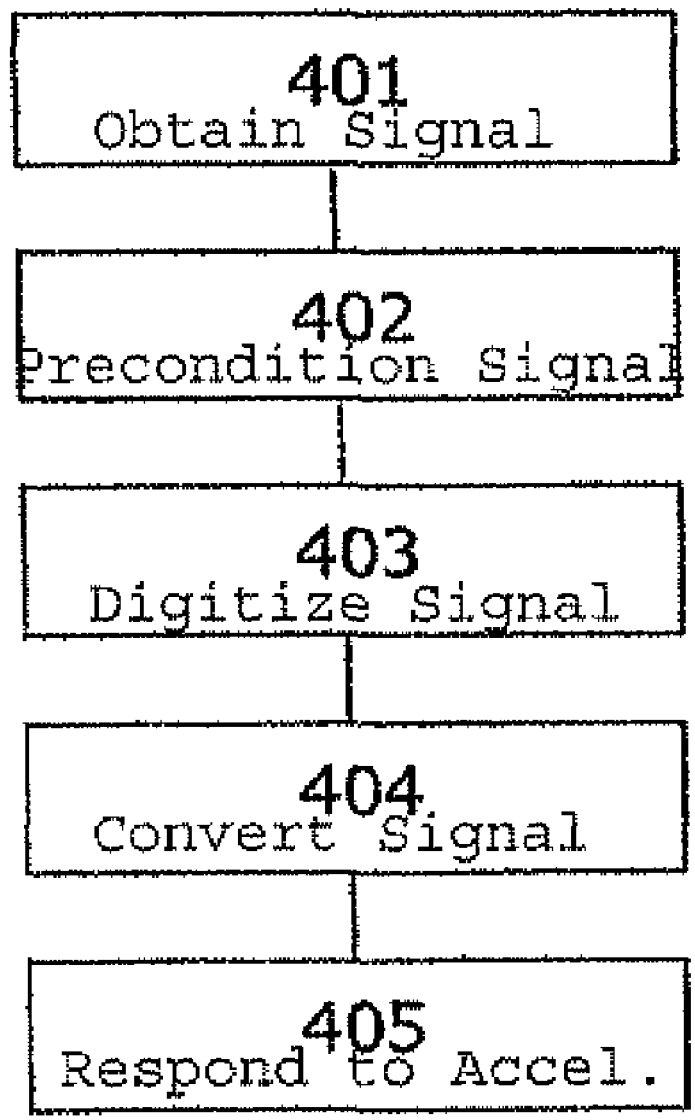
FIG. 4 illustrates in a schematic block diagram an exemplary method according to the present invention.

FIG. 4 illustrates a method consistent with the present invention. Referring to FIG. 4, the method may include obtaining a signal from a motor element (401). The method may also optionally include preconditioning the signal (402). The method may also include digitizing the signal (403) and relating the signal to acceleration units (404). That is, the signal may be analyzed and converted to acceleration information indicating the acceleration of the device during the movement of the device (e.g., while a user holding the device is falling). The method may further include responding to the measured acceleration (405).

Figure 5:
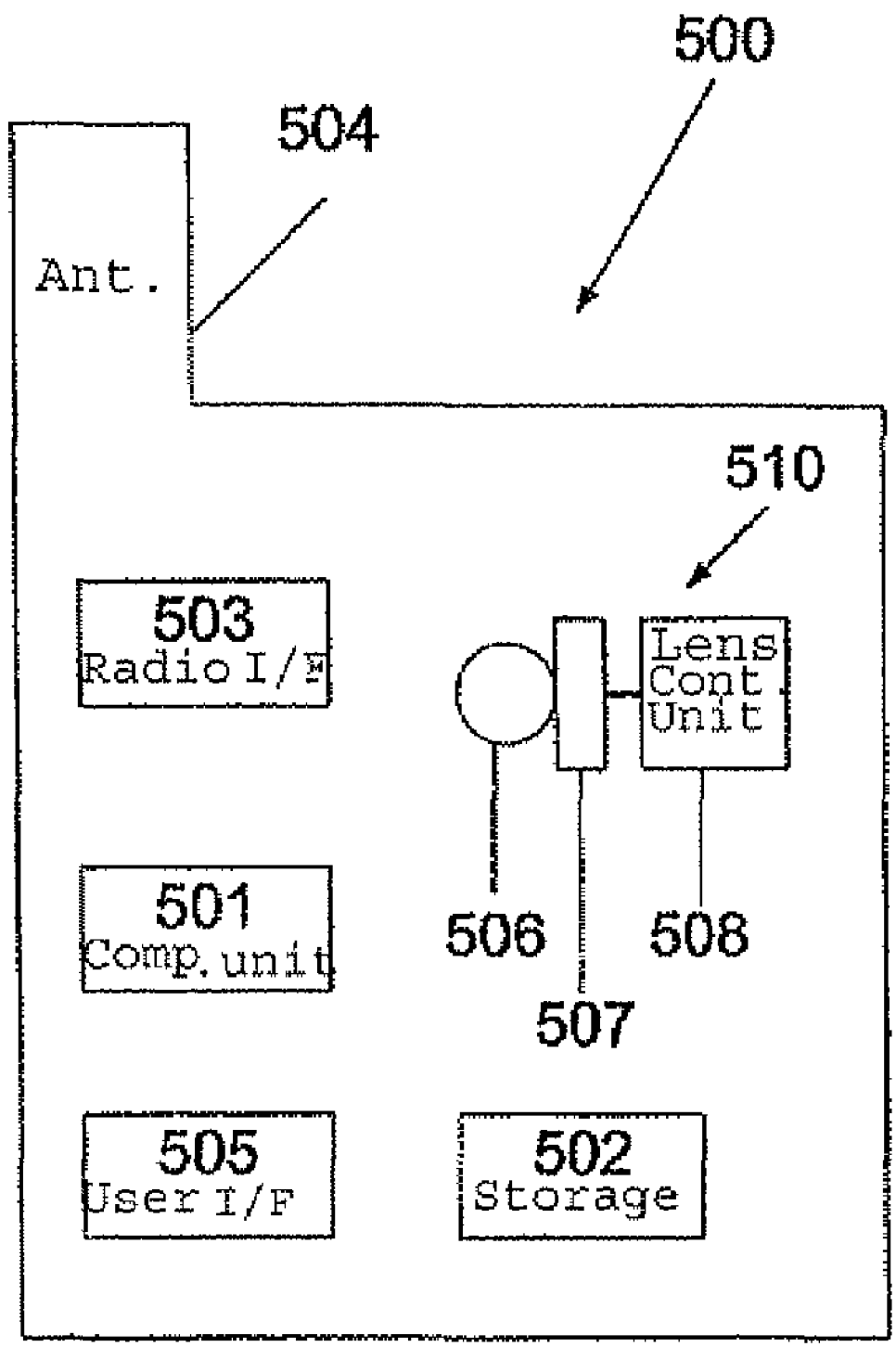
FIG. 5 illustrates in a schematic block diagram of an exemplary mobile phone according to the present invention.

Aspects described herein may, for instance, be implemented in a mobile phone comprising a camera with auto-focus and/or a zoom lens. For example, FIG. 5 illustrates an exemplary schematic block diagram of a mobile phone in which aspects described herein may be implemented. Referring to FIG. 5, mobile phone 500 may include at least computational unit 501, storage unit 502, radio interface unit 503, antenna 504, a camera system 510 (e.g. lens 506, lens motor 507, and lens control unit 508), and user interface control unit(s) 505 (e.g. for display, keypad, microphone, and speaker). The mobile phone 500 may also include other parts as well understood by the person skilled in the art. The low cost acceleration detector can then be used for implementing a drop detection function which can be used by operators, mobile phone distributors or manufacturers to read out from the storage unit 502 if the phone 500 has been dropped during handling by the customer/user. The phone is then arranged to store acceleration signals that exceeds a pre-defined acceleration level in the storage unit 502. The phone 500 can also be implemented with a simple pedometer for counting steps. Another function that may be implemented is an emergency function that springs into action if the phone is subjected to accelerations over a certain threshold. For example, it can be used as a fall detector for elderly people (or other people as well). The mobile phone 500 may be arranged with functionality that if the accelerometer indicates signals above the threshold it can call a help center where support personal may receive the call and from this deduce if the person carrying the mobile phone has fallen down and may be in need of assistance. Since the mobile phone has long range coverage through the cell system, the person can freely move around in the community and is less restricted to a special environment, for instance a nursing home or his or her home.

Aspects described herein provide a one axis acceleration detector (or one dimensional movement detector), but can be combined with an acceleration detector of "solid state" type to get further acceleration information associated with additional axes. In such cases, the one dimensional acceleration/movement information will still be beneficial since the cost will be reduced as compared to using an acceleration detector with higher number of sensitive axes.

It should be emphasized that the term "comprises/comprising" when used in this specification is taken to specify the presence of stated features, integers, step, or components, but does not exclude the presence or addition of one or more other features, integers, steps, components, or groups thereof. In addition, the words "a" or "an" preceding an element does not exclude the presence of a plurality of such elements. Aspects of the invention described herein can at least in part be implemented in either software or hardware and/or a combination of hardware and software.

The above mentioned and described embodiments are only given as examples and should not be construed as limiting to the present invention. Other solutions, uses, and functions within the scope of the invention as claimed in the below described patent claims should be apparent to one of ordinary skill in the art.

What is claimed is:

1. A lens adjusting device comprising:
   a first housing to house a camera lens;
   a displacement arrangement to:
      telescopically displace the first housing substantially in and out of a second housing, and
      generate a signal corresponding to a movement, of the first housing relative to the second housing, associated with an acceleration event;
   a communication interface to communicate the signal to a device external to the lens adjusting device;
   a device to compare the signal to a pre-defined threshold level of acceleration; and
   a protection arrangement to be activated to protect the camera lens and/or the telescopic housing when a result of the comparison indicates that the pre-defined threshold is exceeded.

2. The device of claim 1, where the movement of the first housing comprises a movement of the first housing away from the second housing.

3. The device of claim 1, where the displacement arrangement comprises a stepper motor.

4. The device of claim 1, where the displacement arrangement comprises at least one of a magnetic displacement element, a piezo electric displacement element, or a magneto elastic displacement element.

5. The device of claim 1, further comprising a computational unit for converting the signal to acceleration information that is proportional to the movement.

6. The device of claim 1, where the first housing comprises a zoom lens arrangement, and the protection arrangement is to generate an instruction to retract the zoom lens arrangement.

7. The device of claim 1, where the protection arrangement is to shut a lens cover associated with the first housing.

8. A mobile communication device comprising:
a camera arrangement including a camera housing and a telescopic housing to house a lens of the camera;
a displacement arrangement to:
displace the telescopic housing substantially in and out the camera housing, and
generate a signal corresponding to a movement, of the telescopic housing relative to the camera housing, related to an acceleration event for the mobile communication device;
a device to compare the signal corresponding to the movement to a pre-defined threshold level of acceleration; and
a protection arrangement to be activated to protect the lens and/or the telescopic housing, based on a result of the comparison indicating that the pre-defined threshold level of acceleration is exceeded.

9. The mobile communication device of claim 8, where the pre-defined threshold level of acceleration is indicative of dropping of the mobile communication device.

10. The mobile communication device of claim 9, further comprising:
a communication interface to communicate with a support center when the pre-defined threshold level of acceleration has been exceeded.

11. The mobile communication device of claim 9, further comprising:
a storage unit to store the signal when the pre-defined threshold level of acceleration has been exceeded.

12. The mobile communication device of claim 8, further comprising:
a pedometer to use the signal to determine a number of steps taken by a user of the mobile communication device.

13. The mobile communication device of claim 8, where the telescopic housing comprises a zoom lens arrangement, and the protection arrangement is to generate an instruction to retract the zoom lens arrangement.

14. The mobile communication device of claim 8, where the protection arrangement is to shut a lens cover associated with the telescopic housing.

15. A method of detecting an acceleration of a camera, related to an acceleration event, comprising:
using an actuator element, to:
telescopically drive a lens housing of the camera substantially in and out of a camera housing, and
output a signal indicative of a movement, of the lens housing relative to the camera housing, associated with the acceleration of the camera;
reading the signal by a microprocessor associated with the camera;
converting the signal read by the microprocessor to form acceleration information corresponding to the movement of the lens housing;
comparing the signal to a pre-defined threshold level of acceleration; and
activating, based comparison results indicating that the pre-defined threshold is exceeded, a protection arrangement of the camera to protect the lens housing and/or a camera lens.

16. The method of claim 15, where the camera resides in a mobile phone.

17. The method of claim 15, further comprising:
pre-conditioning the signal prior to reading the signal by the microprocessor.

18. The method of claim 15, where the using the actuator element to output the signal comprises a reverse operation of the actuator element.

19. The method of claim 15, where the lens housing comprises one of an autofocus system or a zoom lens arrangement, and the activating the protection arrangement comprises generating an instruction to retract the one of the autofocus system or the zoom lens arrangement.

20. The method of claim 15, where the activating the protection arrangement comprises shutting a lens cover associated with the lens housing.

* * * * *